United States Patent
Adachi

(10) Patent No.: US 9,514,541 B2
(45) Date of Patent: Dec. 6, 2016

(54) IMAGE PROCESSING APPARATUS AND IMAGE PROCESSING METHOD

(75) Inventor: Keiji Adachi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 150 days.

(21) Appl. No.: 13/454,441

(22) Filed: Apr. 24, 2012

(65) Prior Publication Data

US 2012/0293486 A1    Nov. 22, 2012

(30) Foreign Application Priority Data

May 20, 2011   (JP) ................................. 2011-114110

(51) Int. Cl.
  *G06K 9/00*   (2006.01)
  *H04N 7/18*   (2006.01)
  *G06T 7/20*   (2006.01)

(52) U.S. Cl.
  CPC ....... *G06T 7/20* (2013.01); *G06T 2207/10016* (2013.01); *G06T 2207/30232* (2013.01)

(58) Field of Classification Search
  CPC ......... B60R 1/00; B07C 5/10; H04N 5/23212; H04N 7/181; G06T 2207/10016; G06T 11/60; G06F 3/0421; G08B 13/19602
  USPC ... 382/103; 345/175, 619; 348/94, 148, 154, 348/155, 352
  See application file for complete search history.

(56) References Cited

U.S. PATENT DOCUMENTS

| | | | |
|---|---|---|---|
| 8,411,933 B2 | 4/2013 | Uehori | |
| 2003/0076997 A1* | 4/2003 | Edanami | 382/218 |
| 2007/0065134 A1* | 3/2007 | Sugimoto | 396/165 |
| 2007/0217780 A1* | 9/2007 | Hirooka et al. | 396/287 |
| 2007/0236411 A1* | 10/2007 | Kurosaki et al. | 345/30 |
| 2008/0002960 A1* | 1/2008 | Ito | G03B 13/36 396/125 |

(Continued)

FOREIGN PATENT DOCUMENTS

| | | |
|---|---|---|
| CN | 1840461 A | 10/2006 |
| CN | 101727872 A | 6/2010 |

(Continued)

OTHER PUBLICATIONS

Chinese Official Action dated Oct. 10, 2014, mailed in counterpart Chinese Patent Application No. 201210157994.9, with an English translation.

(Continued)

*Primary Examiner* — Jacinta M Crawford
*Assistant Examiner* — Yi Yang
(74) *Attorney, Agent, or Firm* — Fitzpatrick, Cella, Harper & Scinto

(57) ABSTRACT

An image processing apparatus includes a detection unit that detects that a center position of an area corresponding to at least a portion of an object moving within a display screen has moved across an object detection line segment set in the display screen. A setting unit sets an inhibition region, where the detection is inhibited, along a frame of the display screen to provide both (i) a non-inhibition region where the detection is not inhibited and (ii) the inhibition region, together with each other in the display screen, after setting the inhibition region. The non-inhibition region is a remaining region in the display screen, other than the inhibition region. The detection unit detects that the center position has moved across the object detection line segment set in the non-inhibition region.

6 Claims, 8 Drawing Sheets

(56) References Cited

U.S. PATENT DOCUMENTS

2009/0259958 A1* 10/2009 Ban ..................... G06F 3/0481
　　　　　　　　　　　　　　　　　　　　　　715/765
2011/0019873 A1* 1/2011 Yamato ..................... 382/103
2012/0195460 A1* 8/2012 Inigo ........................ 382/103

FOREIGN PATENT DOCUMENTS

| JP | 2002-373332 A | 12/2002 |
| JP | 2010-50934 A | 3/2010 |
| JP | 2010050934 | * 3/2010 |
| JP | 2010-128727 A | 6/2010 |

OTHER PUBLICATIONS

Japanese Office Action dated Mar. 6, 2015, issued in counterpart Japanese Patent Application No. 2011-114110.

* cited by examiner

FIG. 3A

| Parameter 1 | |
|---|---|
| Coordinates | (10,10), (20,30) |
| Region Type | Line |
| Size | 100-250 |
| Event | cross |

FIG. 3B

| Parameter 1 | |
|---|---|
| Coordinates | (950,250), (950,600) |
| Region Type | Line |
| Size | 300-400 |
| Event | cross |

FIG. 3C

| Parameter 1 | |
|---|---|
| Coordinates | (1190,250), (1190,600) |
| Region Type | Line |
| Size | 150-200 |
| Event | cross |

IMAGE PROCESSING APPARATUS AND IMAGE PROCESSING METHOD

BACKGROUND OF THE INVENTION

Field of the Invention

The present invention relates to an image processing apparatus and image processing method for observation or monitoring using pictures.

Description of the Related Art

When detecting the passage of an object or human body through a specific portion in a screen by using a picture obtained from a surveillance camera or the like, a conventional technique tracks the object or human body detected from the picture within the screen and detects the passage through the specific portion.

There is known a conventional technique of detecting an object from motion vectors, estimating a search position in the next frame, and tracking the object by template matching (for example, Japanese Patent Laid-Open No. 2002-373332). There is also known a technique as a conventional example, which performs face tracking based on motion information detected from the correlation between a current frame and a past frame (for example, Japanese Patent Laid-Open No. 2010-50934). It is possible to determine the passage of an object through a specific portion based on this tracking result. In general, when performing passage detection, the passage of an object is determined by detecting that a tracking line, which is the locus of object tracking, intersects with a set determination line segment or determination region frame.

When, however, a passage detection line is set near the upper and lower ends or the left and right ends within an imaging screen, even an object which has passed over the passage detection line cannot be detected sometimes. Assume the use of a scheme of tracking a tracking position in an object to be detected on an object barycenter basis, when detecting an object moving from outside to inside a screen. In this case, in the first image which depicts an object which has entered the screen, the barycentric position has already been located inside the set detection line and has passed it. This is because when the object appears in the imaging screen, the barycentric position has already been located inwardly from the screen by several pixels. For this reason, in this case, the tracking line of the barycentric position does not intersect with the passage detection determination line, and hence the passage of the object cannot be detected. This phenomenon is especially noticeable for a fast object.

The following is another example of inability to detect passage. When an object is located at the position of a screen end, it is not possible to determine the moving direction of the object in the image captured for the first time. This makes it impossible sometimes to detect the passage of the object.

On the other hand, it is possible to set a detection method of determining the passage of an object to be detected when part of the object comes into contact with a detection line instead of the barycenter of the object. This can avoid the above detection omission, but may cause false detection. For example, when, in fact, an object has just passed nearby a detection line although part of the object has touched the line, false detection occurs because the object has not actually moved across the detection line. For this reason, the passage of an object is generally detected by tracking the barycenter of the object or the midpoint of a diagonal line of the object and using the intersection between it and a detection line.

When settings are made to inhibit the detection of any object having a specific size or less upon filtering the size of each object to be detected, part of the object falls outside the screen at a screen end. For this reason, the apparent size of the object to be detected decreases on the screen, and the object is excluded from detection at the time of filtering. This may lead to detection omission.

SUMMARY OF THE INVENTION

The present invention has been made in consideration of the above problems, and provides a technique for preventing false detection near a screen end when detecting the passage of an object or human body through a specific portion within a screen by using the pictures obtained from a surveillance camera or the like.

According to the first aspect of the present invention, there is provided an image processing apparatus comprising: a detection unit that detects that an object moving within a display screen has passed through an object detection line segment set in the display screen; and a setting unit that sets a region, where the detection is inhibited, in a frame of the display screen, wherein the detection unit detects that the object has passed through the object detection line segment set in a region other than the region set by the setting unit.

According to the second aspect of the present invention, there is provided an image processing method comprising: a detection step of detecting that an object moving within a display screen has passed through an object detection line segment set in the display screen; and a setting step of setting a region, where the detection is inhibited, in a frame of the display screen, wherein in the detection step, it is detected that the object has passed through the object detection line segment set in a region other than a region set in the setting step.

According to the third aspect of the present invention, there is provided a non-transitory computer-readable storage medium recording a program for causing a computer to execute a detection step of detecting that an object moving within a display screen has passed through an object detection line segment set in the display screen, and a setting step of setting a region, where the detection is inhibited, in a frame of the display screen, wherein in the detection step, it is detected that the object has passed through the object detection line segment set in a region other than a region set in the setting step.

Further features of the present invention will become apparent from the following description of exemplary embodiments with reference to the attached drawings.

BRIEF DESCRIPTION OF THE DRAWINGS

FIG. 3A is a view showing the first arrangement example of parameters defining an object detection region;

FIG. 3B is a view showing the second arrangement example of parameters defining an object detection region;

FIG. 3C is a view showing the third arrangement example of parameters defining an object detection region;

DESCRIPTION OF THE EMBODIMENTS

An embodiment of the present invention will be described below with reference to the accompanying drawings. The embodiment described below is an example of concrete execution of the present invention, and one of the specific embodiments of the arrangements described in the scope of claims.

This embodiment is directed to an image processing apparatus which displays a moving image depicting a moving object in a display screen to detect that the object moving in the display screen has passed through an object detection region set in the display screen.

Figure 1:
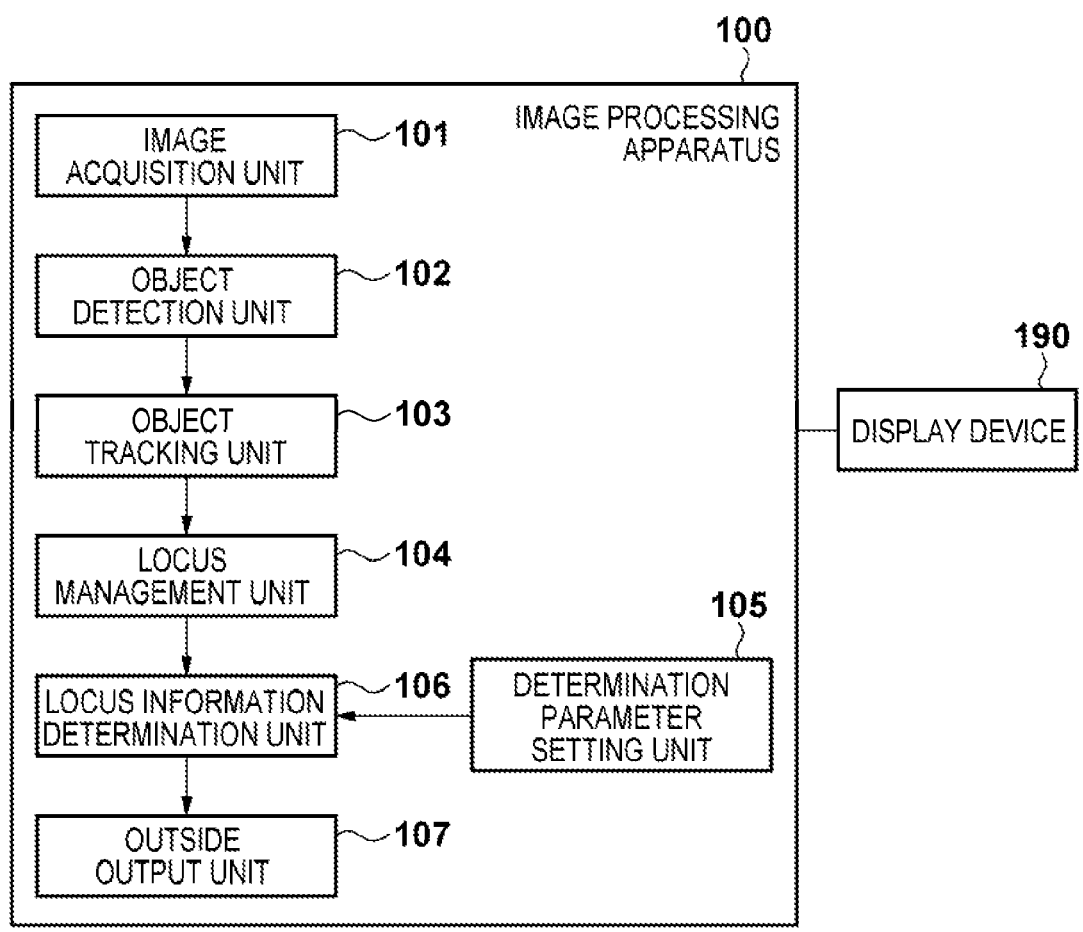
FIG. 1 is a block diagram showing an example of the functional arrangement of an image processing apparatus.

An example of the functional arrangement of the image processing apparatus according to this embodiment will be described first with reference to the block diagram of FIG. 1. An image processing apparatus 100 can be a general PC (Personal Computer), an image processing circuit mounted in a camera capable of capturing moving images, or another type of device as long as it can implement the function of the image processing apparatus described above.

A display device 190 formed by a CRT, liquid crystal screen, or the like is connected to the image processing apparatus 100. The image processing apparatus 100 displays its processing result on the display device 190 in the form of images, characters, and the like. The following is a case in which a moving image is displayed on the display screen of the display device 190.

An image acquisition unit 101 sequentially acquires the images of frames constituting a moving image depicting one or more objects which move in and out of the display screen or move across a plurality of frames within the display screen. The image acquisition unit 101 sequentially outputs the acquired images of the respective frames to an object detection unit 102. The image acquisition unit 101 may acquire such a moving image from an imaging device capable of capturing moving images or a device holding such moving images in advance. That is, the source of moving images is not specifically limited.

The object detection unit 102 detects an object depicted in the image of a frame received from the image acquisition unit 101 by using a technique such as a background differencing technique. Obviously, the object detection method to be used is not limited to any specific method. Upon detecting an object from the image of a given frame, the object detection unit 102 generates various kinds of information (to be described later) associated with the detection.

When the object detection unit 102 detects the same object as that detected from the image of a frame immediately preceding a frame of interest, an object tracking unit 103 associates the objects in the respective frames with each other. Assume that the object tracking unit 103 assigns object ID=A to the object which the object detection unit 102 has detected from the image of the frame immediately preceding the frame of interest. When the object detection unit 102 also detects the same object from the frame of interest, the object tracking unit 103 also assigns object ID=A to the object. In this manner, when identical objects are detected throughout a plurality of frames, the same ID is assigned to each object. Note that a new object ID is assigned to an object newly detected in a frame of interest.

Figure 2:
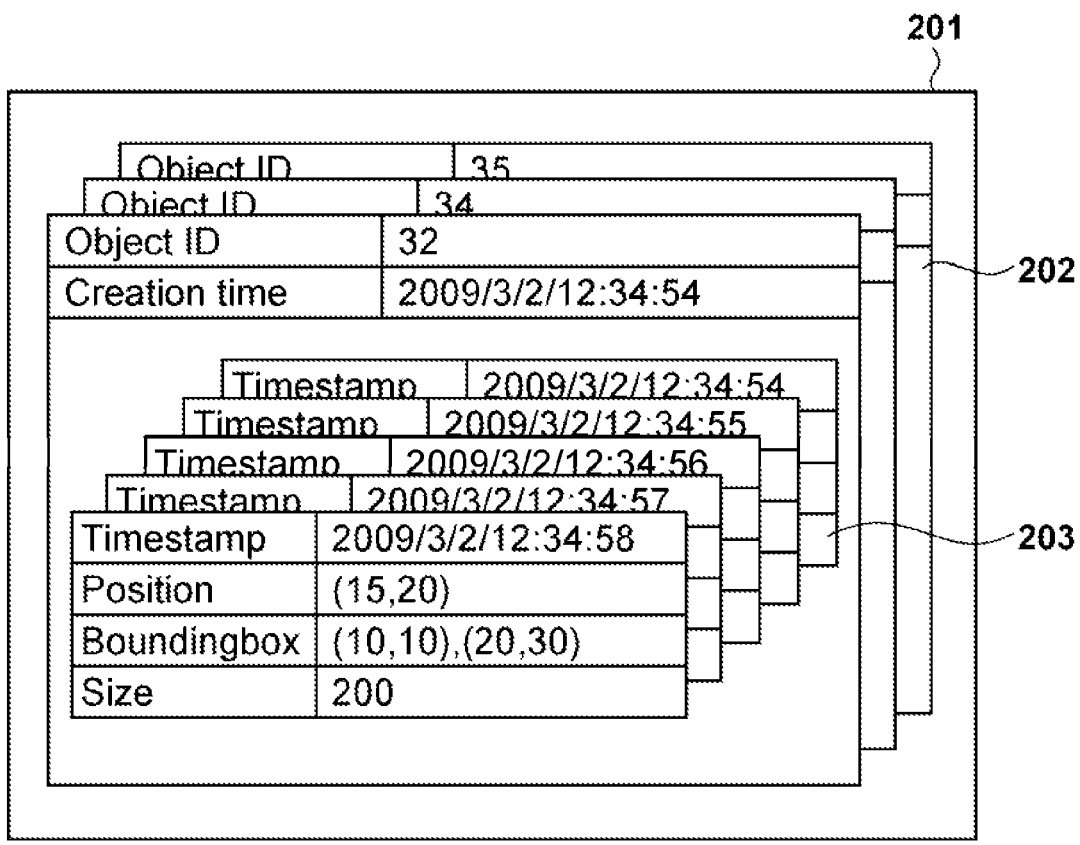
FIG. 2 is a view showing an example of the arrangement of information managed by a locus management unit 104.

A locus management unit 104 manages information for each object which is obtained by the object detection unit 102 and the object tracking unit 103. FIG. 2 shows an example of the arrangement of information managed by the locus management unit 104.

In management information 201 managed by the locus management unit 104, information (object information) 202 is managed for each object. In other words, in the management information 201, the object information 202 is managed for each object ID. In the object information 202 for one object, information 203 is managed for each frame (Timestamp) in which the object has been detected. The information 203 includes a detected coordinate position (Position), information (Boundingbox) which defines a circumscribed rectangle enclosing the region of the detected object, and the size of the object (size). Obviously, pieces of information which can be included in object information are not limited to them, and may include any kind of information as long as it allows to implement the processing to be described below. A locus information determination unit 106 properly uses each information managed by the locus management unit 104.

A determination parameter setting unit 105 acquires or sets parameters for the determination of the passage of an object in the image of each frame through an object detection region, that is, parameters which define the object detection region. The determination parameter setting unit 105 then sets the acquired or set parameters in the locus information determination unit 106.

FIG. 3A shows an example of the arrangement of parameters acquired or set by the determination parameter setting unit 105. The parameters shown in FIG. 3A define a line segment (Line) connecting coordinates (10, 10) and coordinates (20, 30) on the display screen of the display device 190 as an object detection region. These parameters define that when an object having a size (Size) of 100 to 250 has passed through (cross) this object detection region (line segment), the object is regarded as a detection target.

Figure 4:
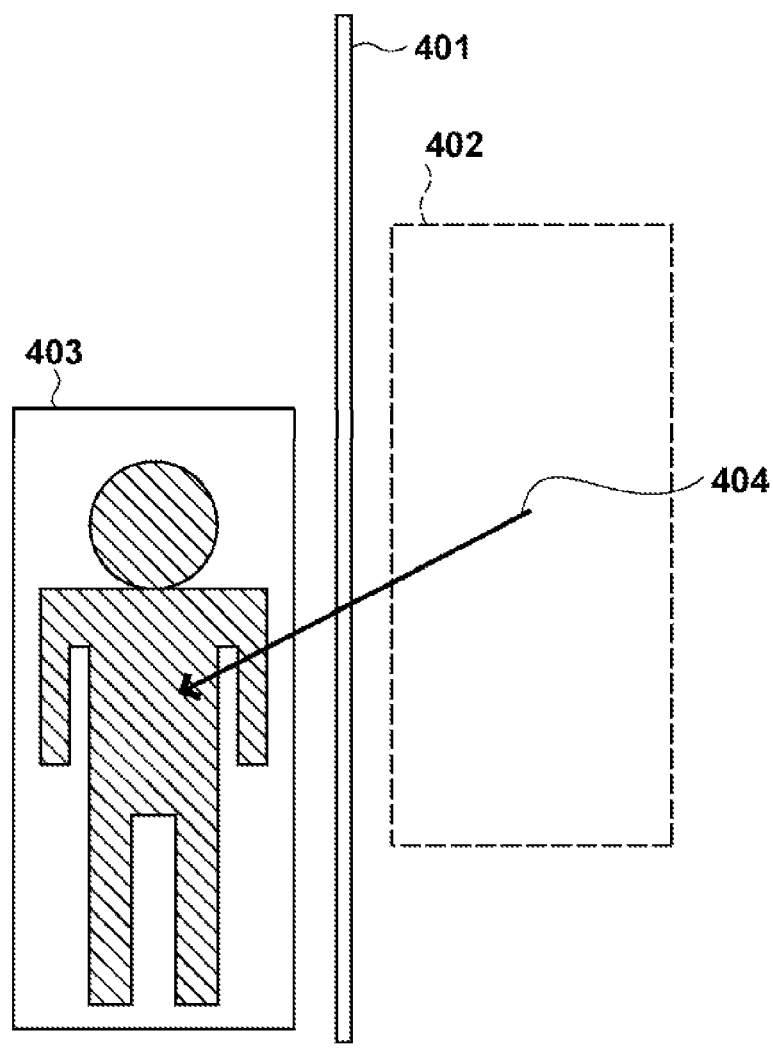
FIG. 4 is a view for explaining the processing performed by a locus information determination unit 106.

The locus information determination unit 106 performs passage determination processing for an object with respect to an object detection region based on the parameters set by the determination parameter setting unit 105 and the information managed by the locus management unit 104. The processing performed by the locus information determination unit 106 when the parameters shown in FIG. 3A are set will be described with reference to FIG. 4.

The locus information determination unit 106 determines whether a motion vector 404 from a circumscribed rectangle 402 of an object in a frame immediately preceding a frame of interest to a circumscribed rectangle 403 of an object in the frame of interest has intersected with a line segment 401 defined by parameters. To determine whether the motion vector has intersected with the line segment is to determine whether the object has passed through the line segment 401.

Figure 5:
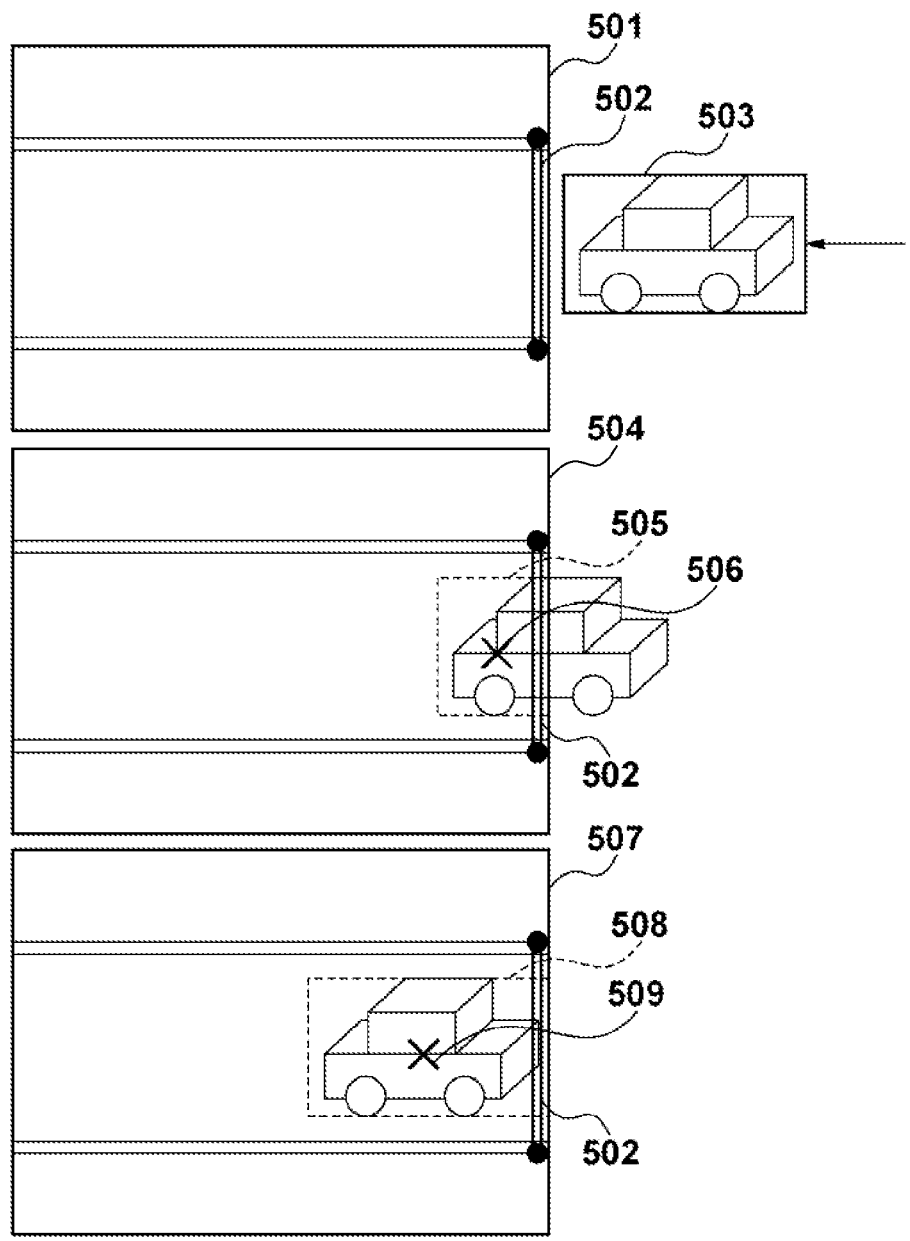
FIG. 5 is a view for explaining the determination of the passage of an object.

Determination of the passage of an object through the above line segment set on an end portion of the display screen of the display device 190 will be described below with reference to FIG. 5.

A screen 501 is the display screen of the display device 190 which is displaying the image of a frame at time t1. A line segment 502 set on the right end of the screen 501 is a line segment defined as an object detection region by parameters. Although not displayed on the screen 501, a vehicle (a circumscribed rectangle 503 in FIG. 5) which will appear in the subsequent frame on the screen is approaching from the right side of the screen 501.

A screen 504 is a display screen of the display device 190 which displays the image of a frame (a frame at time t2) succeeding the frame at time t1. Part of the vehicle is depicted in the screen 504. A circumscribed rectangle 505 is a circumscribed rectangle of the vehicle detected by the object detection unit 102 from the screen 504. A position 506 is the center position of the circumscribed rectangle 505. Assume that the vehicle has appeared for the first time in this frame within the display screen.

A screen 507 is a display screen of the display device 190 which displays the image of a frame (a frame at time t3) succeeding the frame at time t2. All the vehicle is depicted in the screen 507. A circumscribed rectangle 508 is a circumscribed rectangle of the vehicle detected by the object detection unit 102 from the screen 507. A position 509 is the center position of the circumscribed rectangle 508.

When performing passage determination for the screen at time t3, the locus information determination unit 106 determines whether a line segment connecting the position 506 and the position 509 intersects with the line segment 502. In the case shown in FIG. 5, although the object as the vehicle has passed through the line segment 502 in fact, the line segment connecting the position 506 and the position 509 does not intersect with the line segment 502. For this reason, in this case, the locus information determination unit 106 determines that the object as the vehicle has not passed through the line segment 502. This determination is therefore false determined as a result.

Providing an object detection region on an end portion of a screen in this manner will increase the possibility of such false determination. In contrast, in order to prevent such false determination, this embodiment sets a region near an end portion (frame) of a screen as an inhibition region of "detection whether an object moving in the screen has passed through the object detection region set in the screen".

This inhibition region will be described with reference to FIG. 6. Reference numeral 601 denotes an application window which is displayed on the screen of the display device 190 to set an inhibition region; and 602, a region for displaying the image of each frame acquired by the image acquisition unit 101. It is not indispensable to display the image of each frame in the region 602 in the following processing, and the image (still image) of a given frame or no image may be displayed in the region 602.

In this embodiment, a region which inhibits the above passage determination is set in the region 602. Referring to FIG. 6, an inhibition region is set as indicated by reference numeral 603. The inhibition region 603 is a region outside a region 605 enclosed by the following four borders in the region 602:

a border spaced apart from the top border of the region 602 by a set distance in an inward direction of the region 602, a border spaced apart from the bottom border of the region 602 by a set distance in an inward direction of the region 602, a border spaced apart from the left border of the region 602 by a set distance in an inward direction of the region 602, and a border spaced apart from the right border of the region 602 by a set distance in an inward direction of the region 602.

In other words, this embodiment is configured to perform the above passage determination only the region 605 enclosed by these four borders. Referring to FIG. 6, reference numeral 604 denotes the distance (set distance) between the bottom border of the region 605 and the bottom border of the region 602. Since the region 602 is a reduced region of the display screen of the display device 190, the inhibition region 603 is a reduced region of an inhibition region set on the actual display screen. On the actual display screen of the display device 190, a region outside the region enclosed by the following four borders is an inhibition region for passage determination:

a border spaced apart from the top border of the display screen by a set distance in an inward direction of the display screen, a border spaced apart from the bottom border of the display screen by a set distance in an inward direction of the display screen, a border spaced apart from the left border of the display screen by a set distance in an inward direction of the display screen, and a border spaced apart from the right border of the display screen by a set distance in an inward direction of the display screen.

The user can set the inhibition region 603 described above in the region 602 as well as an object detection region by using the determination parameter setting unit 105. In this case, the determination parameter setting unit 105 is implemented by an input device such as a keyboard or mouse. Obviously, the inhibition region 603 may be determined in advance. Referring to FIG. 6, the user sequentially sets points 606, 607, and 608 to set, as an object detection region, a series of line segments constituted by a line segment connecting the points 606 and 607 and a line segment connecting the points 607 and 608. However, as described above, the inhibition region 603 inhibits passage determination, and hence the determination parameter setting unit 105 inhibits an object detection region from being included in the inhibition region 603. In the case shown in FIG. 6, since the point 608 is included in the inhibition region 603, when the user tries to set the point 608, the determination parameter setting unit 105 inhibits the setting operation. Various kinds of methods of inhibiting setting operation are conceivable. If, for example, this apparatus uses a method of making the user operate the determination parameter setting unit 105 to move the cursor and set a point at the current position of the cursor, the apparatus may inhibit the cursor from moving to the inhibition region 603. Alternatively, the apparatus may allow the cursor to move to the inhibition region 603 but may reject point setting operation, or may forcibly move a point set in the inhibition region 603 to the outside of the inhibition region 603.

In this manner, when setting an object detection region in this embodiment, the apparatus controls the setting processing so as to prevent the object detection region from overlapping an inhibition region. As a consequence, the apparatus performs passage determination in regions other than the region which inhibits passage determination, thereby preventing the above false determination.

The determination result obtained by the locus information determination unit 106 may be output to the outside via an outside output unit 107. If the outside output unit 107 is a display device formed by a CRT or liquid crystal screen, the outside output unit 107 may be used instead of the display device 190.

Figure 7:
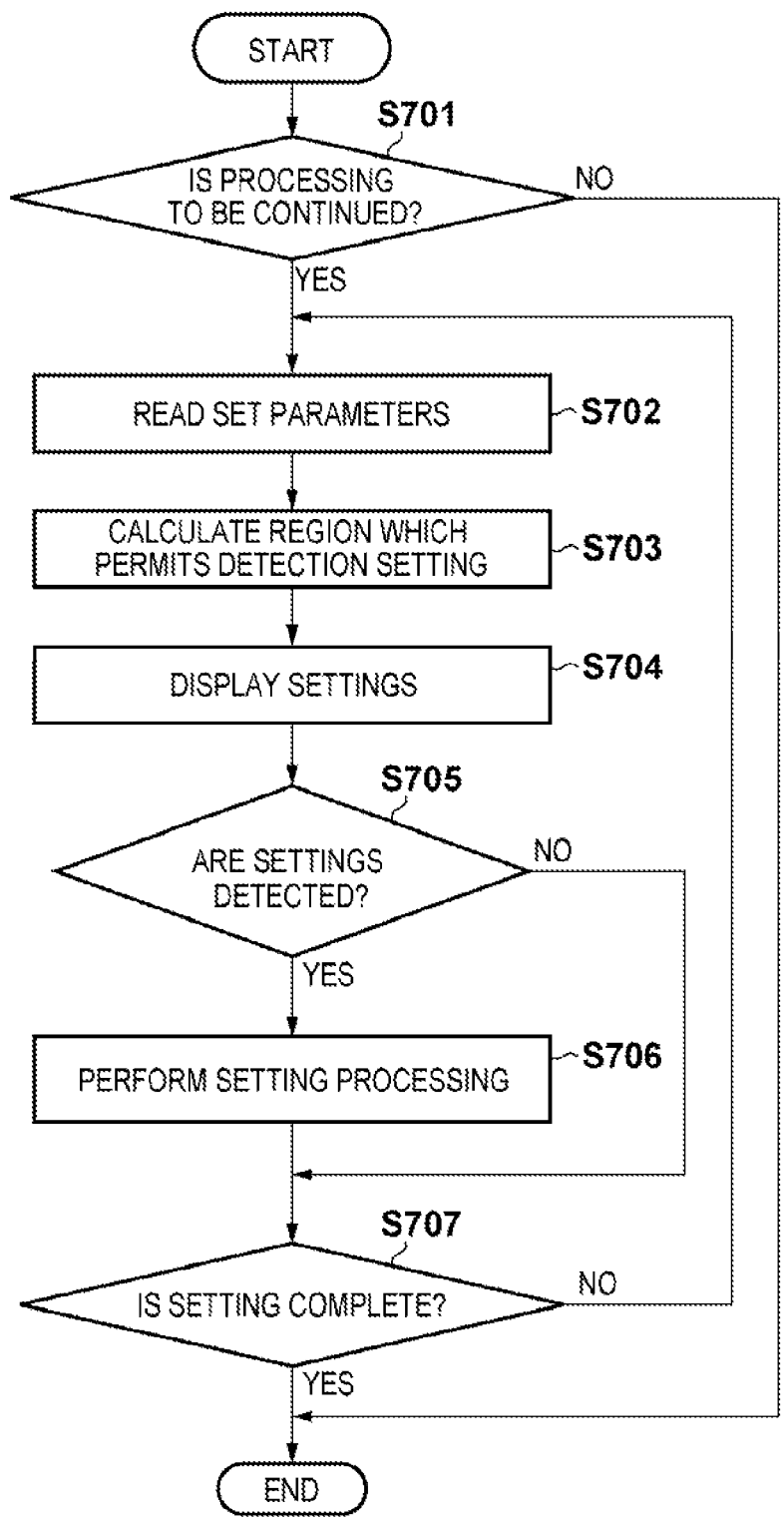
FIG. 7 is a flowchart showing setting processing for an object detection region and an inhibition region.

Setting processing for an object detection region and an inhibition region will be described with reference to FIG. 7 showing a flowchart for this processing.

In step S701, the locus information determination unit 106 determines whether to continue the following processing, that is, to terminate this processing. The apparatus terminates the processing if a condition for terminating the processing is satisfied, for example, an instruction to terminate the processing is input. If the following processing is to be continued, the process advances to step S702.

In step S702, the locus information determination unit 106 reads parameters like those shown in FIG. 3A, which have been acquired or set by the determination parameter setting unit 105, from the determination parameter setting unit 105. If the determination parameter setting unit 105 has not acquired/set such parameters, the process advances to step S704 while skipping steps S702 and S703.

Figure 8:
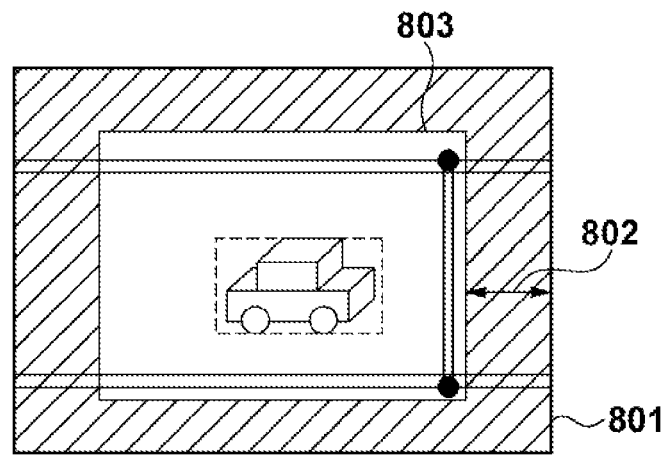
FIG. 8 is a view for explaining setting processing for an inhibition region.

In step S703, the locus information determination unit 106 calculates a region which permits detection of an object and a region which inhibits detection of an object from the parameters read in step S702. Processing performed in this step will be described with reference to FIGS. 3B and 8.

Assume that the parameters read in step S702 are those having the arrangement shown in FIG. 3B. According to the parameters shown in FIG. 3B, a line segment (Line) connecting coordinates (950, 250) and coordinates (950, 600) on the display screen of the display device 190 is defined as an object detection region. In addition, the parameters define that when an object having a size (Size) of 300 to 400 has passed through this object detection region (line segment), the object is regarded as a detection target.

Upon acquiring such parameters from the determination parameter setting unit 105, the locus information determination unit 106 may set a set distance 802 to half of the maximum size of the object to be detected, that is, 200. Assume that the coordinate positions of the upper left and lower right corners of a display screen 801 of the display device 190 are respectively (0, 0) and (1200, 1000). In this case, the locus information determination unit 106 sets the inside of a rectangular region 803 with the coordinate positions of the upper left and lower right corners being (200, 200) and (1000, 800), respectively, as a region which allows to set an object detection region, and a region outside the rectangular region 803 as the above inhibition region.

Assume that the locus information determination unit 106 has read parameters having the arrangement shown in FIG. 3C from the determination parameter setting unit 105 in step S702. The parameters shown in FIG. 3C define a line segment (Line) connecting coordinates (1190, 250) and coordinates (1190, 600) on the display screen of the display device 190 as an object detection region. These parameters also define that when an object having a size (Size) of 150 to 200 has passed through (cross) this object detection region (line segment), the object is regarded as a detection target.

Figure 10:
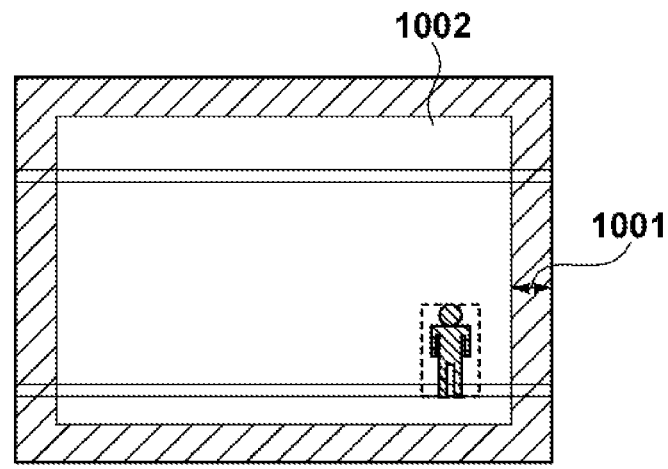
FIG. 10 is a view for explaining setting processing for an inhibition region.

Upon acquiring such parameters from the determination parameter setting unit 105, the locus information determination unit 106 may set a set distance 1001 to half of the maximum size of the object to be detected, that is, 100, as shown in FIG. 10. In this case, the locus information determination unit 106 sets the inside of a rectangular region 1002 with the coordinate positions of the upper left and lower right corners being (100, 100) and (1100, 900), respectively, as a region which allows to set an object detection region, and a region outside the rectangular region 1002 as the above inhibition region. In this case, part of the object detection region is included in the inhibition region.

The apparatus may re-set either or both of an object detection region and an inhibition region so as to avoid the object detection region from being included in the inhibition region. If, for example, an object detection region is to be re-set, "Coordinate" of the parameters shown in FIG. 3C may be corrected to (1100, 250) and (1100, 600).

According to the above description, a set distance is obtained in accordance with the size of an object to be detected. However, another method may be used as a method of obtaining a set distance. For example, it is possible to obtain a set distance in accordance with the moving speed of this object in the screen. In this case, it is possible to obtain the moving distance of the object between a current frame and a past frame in the screen as a moving speed and increase a set distance with an increase in obtained moving speed.

Figure 6:
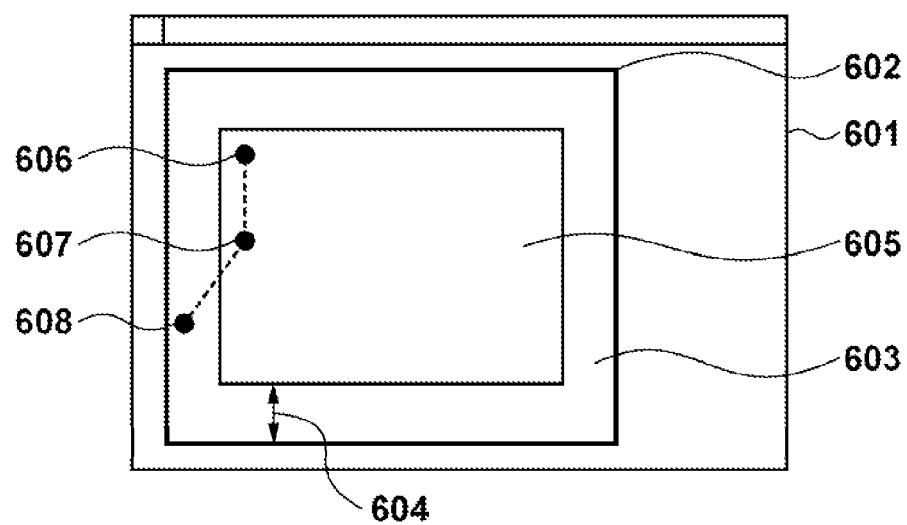
FIG. 6 is a view for explaining an application window.

Referring back to FIG. 7, in step S704, as shown in FIG. 6, the apparatus displays an application window showing a region which inhibits detection of an object and an object detection region on the display screen of the display device 190. A method of displaying each region is not limited to this.

When the process advances to step S704 while skipping steps S702 and S703, the apparatus does not display an object detection region or an inhibition region, and the user newly sets these regions by operating the determination parameter setting unit 105 in step S704.

According to the above description, the width and height of an object to be detected are not designated. However, a width and a height may be added as setting items. In this case, when calculating set distances in step S703, it is possible to set a set distance at the top and bottom borders in accordance with a height, and a set distance at the left and right borders in accordance with a width. When, for example, setting a human body as an object to be detected, since the human body is an object which is longer in the widthwise direction than in the height direction, the set distance at the top and bottom borders is longer than that at the left and right borders. This also applies to a case in which a set distance is obtained in accordance with the moving speed of the object. That is, when parameters are set on the assumption that the moving speed of the same object varies in the horizontal and vertical directions depending on the installation conditions for a camera, it is possible to set a set distance at the top and bottom borders in accordance with the moving speed in the vertical direction and a set distance at the left and right borders in accordance with the moving speed in the horizontal direction.

In step S705, the locus information determination unit 106 determines whether an inhibition region or an object detection region has been set (re-set). This determination is to determine whether the user has set (re-set) an inhibition region or an object detection region by, for example, changing a set distance, editing or creating an object detection region in the application window by using the determination parameter setting unit 105. If the apparatus determines as a result of this determination that the user has not set (re-set) any region, the process advances to step S707. If the apparatus determines that the user has set (re-set) a region, the process advances to step S706.

In step S706, the locus information determination unit 106 reflects the change made by setting (re-setting) in the inhibition region and/or the object detection region. More specifically, the locus information determination unit 106 reflects information after a change in object detection region in the information managed by the locus management unit 104 and stores information defining the set (re-set) inhibition region. Assume that the object detection region is included in a region which inhibits the detection of any object at this time. The above coping techniques described above are applied to such a case.

Figure 9:
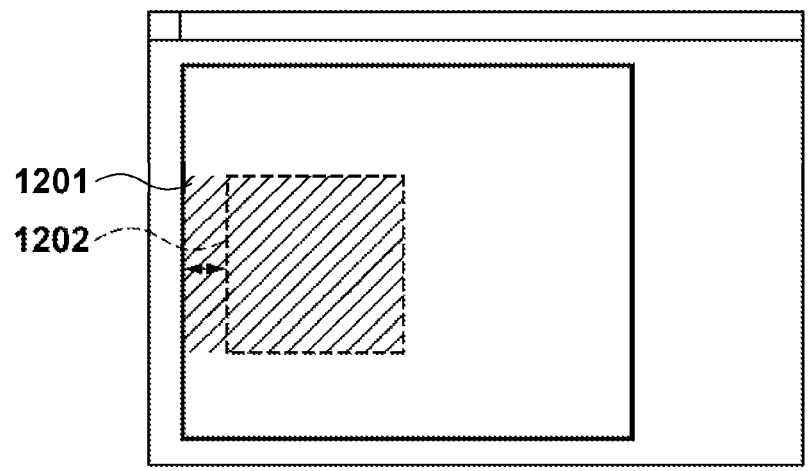
FIG. 9 is a view showing a display example of an object detection region.

For example, in step S706, as shown in FIG. 9, if the user designates a region 1201 as an object detection region, the apparatus may display not only the region 1201 but also a region 1202 which is set by moving the region 1201 so as to prevent it from being included in an inhibition region.

If a situation that will terminate this processing occurs (a condition for the termination of the processing is satisfied or an instruction to terminate the processing is input), the process returns to step S702 through step S707. If no such situation has occurred, the apparatus terminates the processing through step S707. Obviously, if the process returns to step S702 through steps S706 and S707, the change made in step S706 is reflected in the corresponding region.

As has been described above, according to this embodiment, when a detection region is set near the upper and lower ends or the left and right ends within the imaging screen by using the picture obtained from a surveillance camera or the like, it is possible to prevent false detection near an end of the screen.

Obviously, although the above description has exemplified the determination of passage of an object through a region as an example of object detection, the present invention can be applied to other detection contents.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-114110, filed May 20, 2011, which is hereby incorporated by reference herein in its entirety.

What is claimed is:

1. An image processing apparatus comprising:
at least one processor operatively coupled to a memory, serving as:
an acquisition unit that acquires images;
an input unit that receives an instruction, inputted by a user, for setting an object detection line segment in an image area of a display screen, the object detection line segment being used for detecting at least a portion of an object, detected in the images acquired by the acquisition unit that has intersected with the object detection line segment;
a setting unit that sets the object detection line segment, based on the instruction, in the image area of the display screen;
a determination unit that determines whether at least a portion of the object detection line segment set is included in an inhibition region where the detection is inhibited, the inhibition region being set along at least one side of the image area of the display screen and lies between the at least one side of the image area of the display screen and a border spaced apart from the at least one side of the image area of the display screen by a set distance in an inward direction of the display screen; and
an inhibition region setting unit that sets, as the inhibition region where the detection is inhibited, an outside of a region enclosed by (i) a border spaced apart from a top border of the display screen by a set distance in an inward direction of the display screen, (ii) a border spaced apart from a bottom border of the display screen by a set distance in an inward direction of the display screen, (iii) a border spaced apart from a left border of the display screen by a set distance in an inward direction of the display screen, and (iv) a border spaced apart from a right border of the display screen by a set distance in an inward direction of the display screen,
wherein the setting unit (i) allows the object detection line segment to be set based on the instruction in a case when the determination unit determines that at least a portion of the object detection line segment to be set based on the instruction is not included in the inhibition region, (ii) prevents the object detection line segment in the image area of the display screen from being included in the inhibition region in a case when the determination unit determines that at least the portion of the object detection line segment to be set based on the instruction is included in the inhibition region, and (iii) sets the set distance in accordance with one of a size of the object and a moving speed of the object.

2. The apparatus according to claim 1, wherein, in a case when the determination unit determines that at least the portion of the object detection line segment that is set based on the instruction is included in the inhibition region, the setting unit moves the set object detection line segment to any place in the image area, so that the inhibition region does not include the object detection line segment.

3. An image processing method comprising:
acquiring images;
receiving an instruction, inputted by a user, for setting an object detection line segment in an image area of a display screen, the object detection line segment being used for detecting at least a portion of an object, detected in the acquired images that has intersected with the object detection line segment;
setting the objection detection line segment, based on the instruction, in the image area of the display screen; and
determining whether at least a portion of the object detection line segment set is included in an inhibition region where the detection is inhibited, the inhibition region being set along at least one side of the image area of the display screen and lies between the at least one side of the image area of the display screen and a border spaced apart from the at least one side of the image area of the display screen by a set distance in an inward direction of the display screen,
wherein, in the setting step, as the inhibition region where the detection is inhibited, an outside of a region enclosed by (i) a border spaced apart from a top border of the display screen by a set distance in an inward direction of the display screen, (ii) a border spaced apart from a bottom border of the display screen by a set distance in an inward direction of the display screen, (iii) a border spaced apart from a left border of the display screen by a set distance in an inward direction of the display screen, and (iv) a border spaced apart from a right border of the display screen by a set distance in an inward direction of the display screen are set, and further, in the setting step, (i) the object detection line segment is allowed to be set based on the instruction in a case when the determining step determines that at least a portion of the object detection line segment to be set based on the instruction is not included in the inhibition region, (ii) the object detection line segment in the image area of the display screen is prevented from being included in the inhibition region in a case when the determining step determines that at least the portion of the object detection line segment to be set based on the instruction is included in the inhibition region, and (iii) the distance is set in accordance with one of a size of the object and a moving speed of the object.

4. The method according to claim 3, wherein, in a case when it is determined that at least the portion of the object detection line segment that is set based on the instruction is included in the inhibition region, the set object detection line segment is moved to any place in the image area, so that the inhibition region does not include the object detection line segment.

5. A non-transitory computer-readable storage medium recording a program for causing a computer to execute:

acquiring images;

receiving an instruction, inputted by a user, for setting an object detection line segment in an image area of a display screen, the object detection line segment being used for detecting at least a portion of an object, detected in the acquired images that has intersected with the object detection line segment;

setting the object detection line segment, based on the instruction, in the image area of the display screen; and determining whether at least a portion of the object detection line segment set is included in an inhibition region where the detection is inhibited, the inhibition region being set along at least one side of the image area of the display screen and lies between the at least one side of the image area of the display screen and a border spaced apart from the at least one side of the image area of the display screen by a set distance in an inward direction of the display screen, wherein, in the setting step, as the inhibition region where the detection is inhibited, an outside of a region enclosed by (i) a border spaced apart from a top border of the display screen by a set distance in an inward direction of the display screen, (ii) a border spaced apart from a bottom border of the display screen by a set distance in an inward direction of the display screen, (iii) a border spaced apart from a left border of the display screen by a set distance in an inward direction of the display screen, and (iv) a border spaced apart from a right border of the display screen by a set distance in an inward direction of the display screen are set, and further, in the setting step, (i) the object detection line segment is allowed to be set based on the instruction in a case when the determining step determines that at least a portion of the object detection line segment to be set based on the instruction is not included in the inhibition region, (ii) the object detection line segment in the image area of the display screen is prevented from being included in the inhibition region in a case when the determining step determines that at least the portion of the object detection line segment to be set based on the instruction is included in the inhibition region, and (iii) the distance is set in accordance with one of a size of the object and a moving speed of the object.

6. The non-transitory computer-readable storage medium according to claim 5, wherein, in a case when it is determined that at least the portion of the object detection line segment that is set based on the instruction is included in the inhibition region, the set object detection line segment is moved to any place in the image area, so that the inhibition region does not include the object detection line segment.

* * * * *